(12) United States Patent
Bonnain

(10) Patent No.: US 11,807,462 B2
(45) Date of Patent: Nov. 7, 2023

(54) FLEXIBLE PITCH PRODUCT METERING SYSTEM

(71) Applicant: WestRock Packaging Systems, LLC, Atlanta, GA (US)

(72) Inventor: Jean-Christophe Bonnain, Châteauroux (FR)

(73) Assignee: WestRock Packaging Systems, LLC, Atlanta, GA (US)

( * ) Notice: Subject to any disclaimer, the term of this patent is extended or adjusted under 35 U.S.C. 154(b) by 0 days.

(21) Appl. No.: 17/612,421

(22) PCT Filed: May 19, 2020

(86) PCT No.: PCT/US2020/033536
§ 371 (c)(1),
(2) Date: Nov. 18, 2021

(87) PCT Pub. No.: WO2020/236779
PCT Pub. Date: Nov. 26, 2020

(65) Prior Publication Data
US 2022/0227587 A1 Jul. 21, 2022

Related U.S. Application Data

(60) Provisional application No. 62/850,817, filed on May 21, 2019.

(51) Int. Cl.
*B65G 37/00* (2006.01)
*B65B 21/06* (2006.01)
(Continued)

(52) U.S. Cl.
CPC ............ *B65G 37/005* (2013.01); *B65B 21/06* (2013.01); *B65B 35/36* (2013.01); *B65B 35/44* (2013.01);
(Continued)

(58) Field of Classification Search
CPC ...... B65G 54/02; B65G 47/082; B65G 21/06; B65G 47/088; B65G 2201/0244; H02K 41/031; H02K 41/033; H02K 41/0356
(Continued)

(56) References Cited

U.S. PATENT DOCUMENTS 11,186,401 B2 * 11/2021 Giuliani .................... B65C 9/02
2012/0261233 A1 * 10/2012 Huettner ................. B65G 54/02
198/459.1
2016/0114988 A1 4/2016 Unterseher

FOREIGN PATENT DOCUMENTS

DE 10 2011 016 855 * 10/2012 ............. B65G 23/23
EP 0237778 A2 9/1987
(Continued)

OTHER PUBLICATIONS

PCT International Search Report and Written Opinion dated Aug. 27, 2020, issued during the prosecution of PCT International Patent Application No. PCT/US2020/033536.

*Primary Examiner* — James R Bidwell
(74) *Attorney, Agent, or Firm* — Brian J. Goldberg; Rohini K. Garg

(57) ABSTRACT

A product management system (100) including a first panel (102) with a first continuous track (106) including a queuing section, a product engagement section and a return section, and a first series of magnetic sources (115) disposed circumferentially along the first continuous track (106). A first series of lugs (116) are movably dispersed around the first continuous track (106) configured to react to the first series of magnetic sources in order to increase or decrease a velocity of each lug (116) of the first series of lugs along the first continuous track (116) and a product engagement member (118) attached to each lug configured and adapted to actuate to engage a product.

20 Claims, 8 Drawing Sheets

(51) Int. Cl.
 *B65B 35/36* (2006.01)
 *B65B 35/44* (2006.01)
 *B65G 17/32* (2006.01)
 *B65G 47/08* (2006.01)
 *B65G 54/02* (2006.01)
 *B65G 47/84* (2006.01)

(52) U.S. Cl.
 CPC ......... *B65G 17/323* (2013.01); *B65G 47/082* (2013.01); *B65G 47/088* (2013.01); *B65G 54/02* (2013.01); *B65G 47/846* (2013.01); *B65G 2201/0244* (2013.01); *B65G 2201/0252* (2013.01)

(58) Field of Classification Search
 USPC .......................................................... 198/805
 See application file for complete search history.

(56) References Cited

FOREIGN PATENT DOCUMENTS

| | | | | |
|---|---|---|---|---|
| EP | 2743192 | A1 | 6/2014 | |
| EP | 3385110 | A1 | 10/2018 | |
| FR | 3075188 | * | 6/2019 | ............ B65G 54/02 |
| WO | 2007120969 | A2 | 10/2007 | |
| WO | 2008022296 | A2 | 2/2008 | |
| WO | 2009/097546 | * | 8/2009 | ............ B65B 17/02 |
| WO | 2009097546 | A1 | 8/2009 | |
| WO | 2015/028362 | * | 3/2015 | ............ B65B 21/06 |
| WO | 2015028362 | A1 | 3/2015 | |
| WO | 2016/102092 | * | 6/2016 | ............ B65G 47/32 |
| WO | 2016102092 | A1 | 6/2016 | |
| WO | 2018/193218 | * | 10/2018 | ............ B65G 54/02 |
| WO | 2018193218 | A1 | 10/2018 | |

* cited by examiner

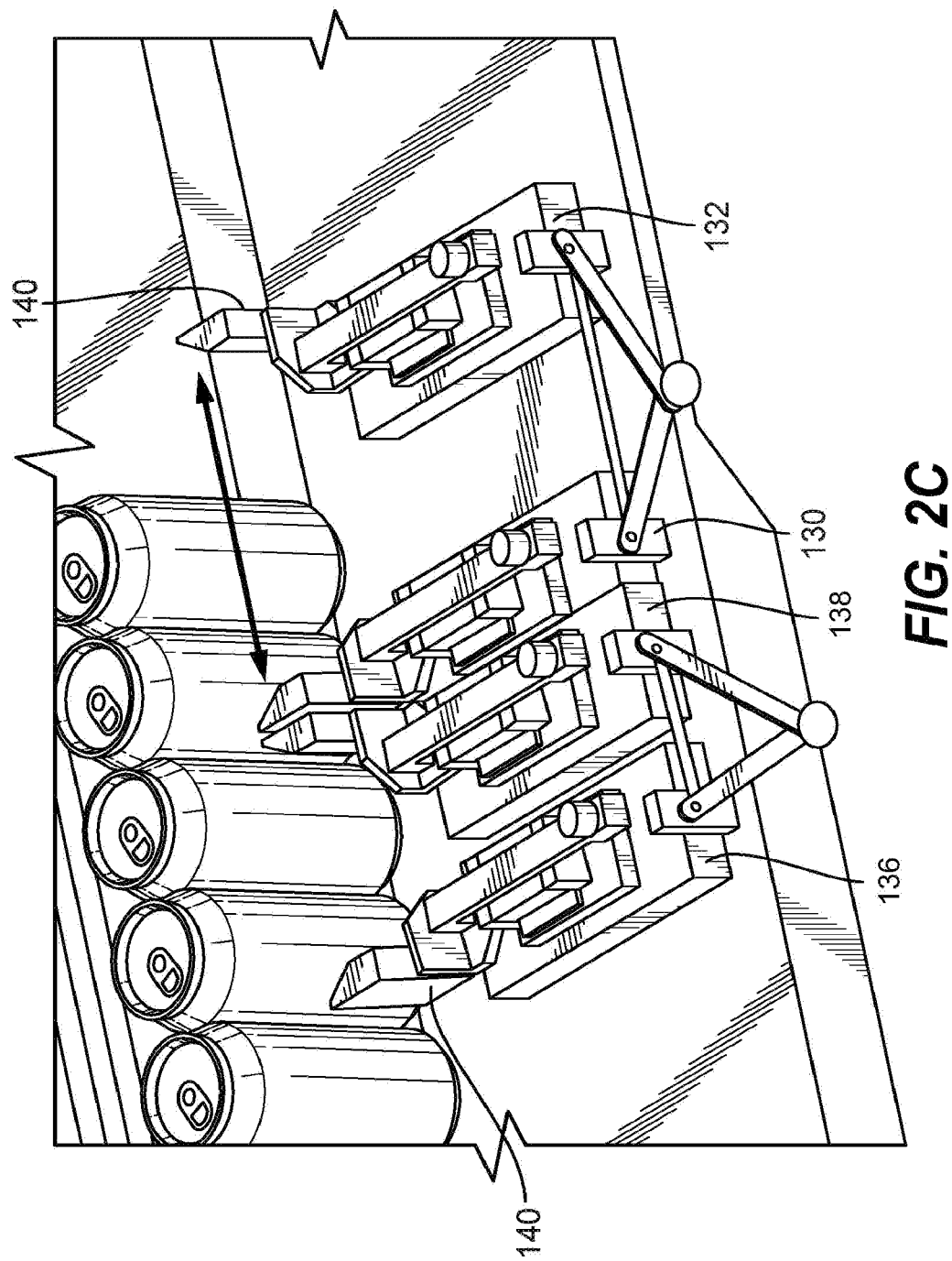

FLEXIBLE PITCH PRODUCT METERING SYSTEM

BACKGROUND

Technological Field

The present disclosure relates to a product metering system, and more particularly to a flexible pitch product metering system.

Description of Related Art

A variety of devices are known in the product metering art. Various systems using conveyors and lugs are used to move product. The conventional methods and systems have generally been considered satisfactory for their intended purpose. However, there is still a need in the art for systems having simplified and faster changeovers of systems from one product to another. Systems require less downtime between product lines in order to be productive. There also remains a need in the art for such systems that are economically viable. The present disclosure may provide a solution for at least one of these remaining challenges.

SUMMARY OF THE INVENTION

A product management system includes a first panel with a first continuous track including a queuing section, a product engagement section and a return section and a first series of magnetic sources disposed circumferentially along the first continuous track, a first series of lugs movably dispersed around the first continuous track configured to react to the first series of magnetic sources in order to increase or decrease a velocity of each lug of the first series of lugs along the first continuous track, and a product engagement member attached to each lug configured and adapted to actuate to engage a product. A second series of magnetic sources can be circumferentially along a second continuous track disposed parallel to the first continuous track and a second series of lugs movably dispersed around the second continuous track configured to react to the second series of magnetic sources in order to increase or decrease a velocity of each lug of the second series of lugs along the first continuous track. The lugs of the first series of lugs and the lugs of the second series of lugs are alternatingly arranged along the first track and alternatingly arranged along the second track.

The product engagement member can include at least one arm actuatable in two Cartesian directions, each lug can include a first product engagement member base and a second product engagement member base, wherein each base includes a product engagement member. The arm can include at least one semi-circular end configured and adapted to engage a can or bottle product or a paddle configured and adapted to engage a trailing or leading side of the product.

Each lug can include a first paddle and second paddle. The first paddle and the second paddle are attached to the lug by a pantograph linkage. Each lug can include of a primary base and secondary base, wherein the primary base is controlled by the magnetic source and the secondary base is independent of the magnetic source, and wherein each base includes a paddle.

The first series of magnetic sources can include a series of magnetic plates are tangentially disposed along the first track, and a series of coils configured and adapted to activating each of the magnetic plates. A controller controls each of the magnetic plates, and the controller is configured and adapted to provide a configurable speed profile for lugs traveling along the first track. The speed profile includes acceleration sections, deceleration sections, and constant speed sections.

At least one star wheel disposed proximate to the lug engagement section of the first continuous track configured and adapted to meter products to the lug engagement section. The product management system can include a second star wheel. The panel can include a first cam and a second cam configured for supporting the series of lugs. Each of the cams partially follows the first track and each of the cams can include at least a pair of undulations.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject invention appertains will readily understand how to make and use the devices and methods of the subject invention without undue experimentation, preferred embodiments thereof will be described in detail herein below with reference to certain figures, wherein:

FIG. 2c is a perspective view a portion of FIG. 1, showing a third embodiment of a product engagement member;

DETAILED DESCRIPTION

Figure 1:
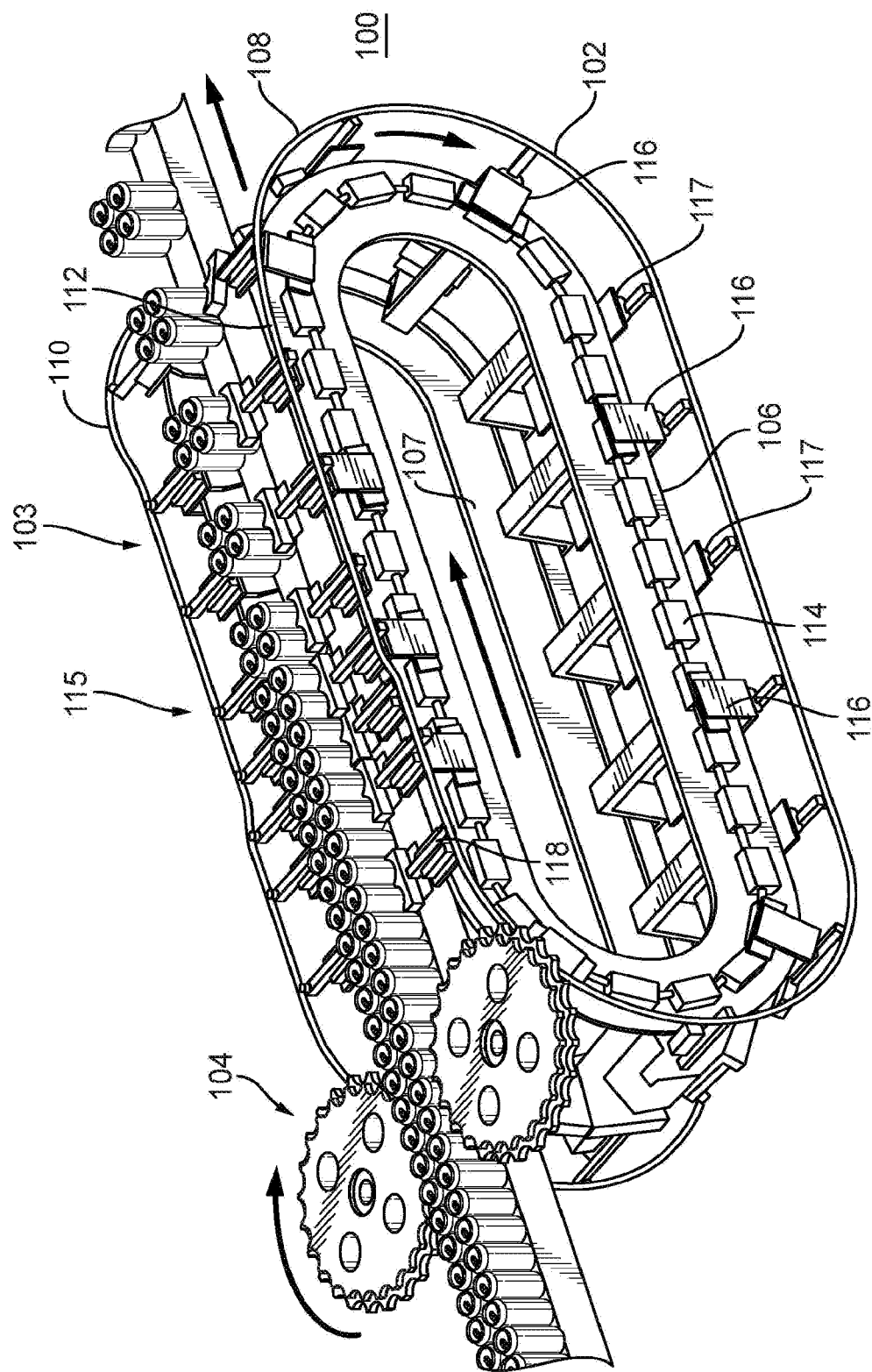
FIG. 1 is a perspective view of a product metering system.

Reference will now be made to the drawings wherein like reference numerals identify similar structural features or aspects of the subject invention. For purposes of explanation and illustration, and not limitation, a partial view of an exemplary embodiment of a product metering system in accordance with the invention is shown in FIG. 1 and is designated generally by reference character 100. Other embodiments of the system in accordance with the invention, or aspects thereof, are provided in FIGS. 2-4, as will be described. The methods and systems of the invention can be used to improve a systems adaptability to changing product packaging and sizing requirements. The system can change configurations on the fly without having to stop the machine, and move and changeover parts.

FIG. 1 shows a product management system 100 for transporting and spacing products, such as beverage cans as required. Spacing the products appropriately allows for seamless packaging of the products into sizes of various packs, such as 2 by 3, 2 by 2, 3 by 4, and so on. The system includes a first panel 102. The panel 102, standing upright, defines a vertical plane. A pair of star wheels 104 are disposed proximate to the location where the system 100 engages the products to meter and force products into the system.

The panel 102 includes within itself a first continuous track 106 along with a first cam 108 and a second cam 110 configured for supporting the lugs. The cams 108,110 partially follow the first track 106 deviating from the path of the track only slightly in one location, at pair of undulations 112. The first continuous track 106 includes a queuing section, a product engagement section and a return section. A first series of magnetic sources 114 is disposed circumferentially along the first continuous track 106. A first series of lugs 116 are movably dispersed about the first continuous track 106, and supported by the cams 108, 110. The lugs 116 are configured to react to the first series of magnetic sources in order to increase or decrease a velocity of each lug while sliding or rolling along the first continuous track 106. Each lug includes a product engagement member 118 attached thereto configured and adapted to contact each product of group of products.

Figure 1A:
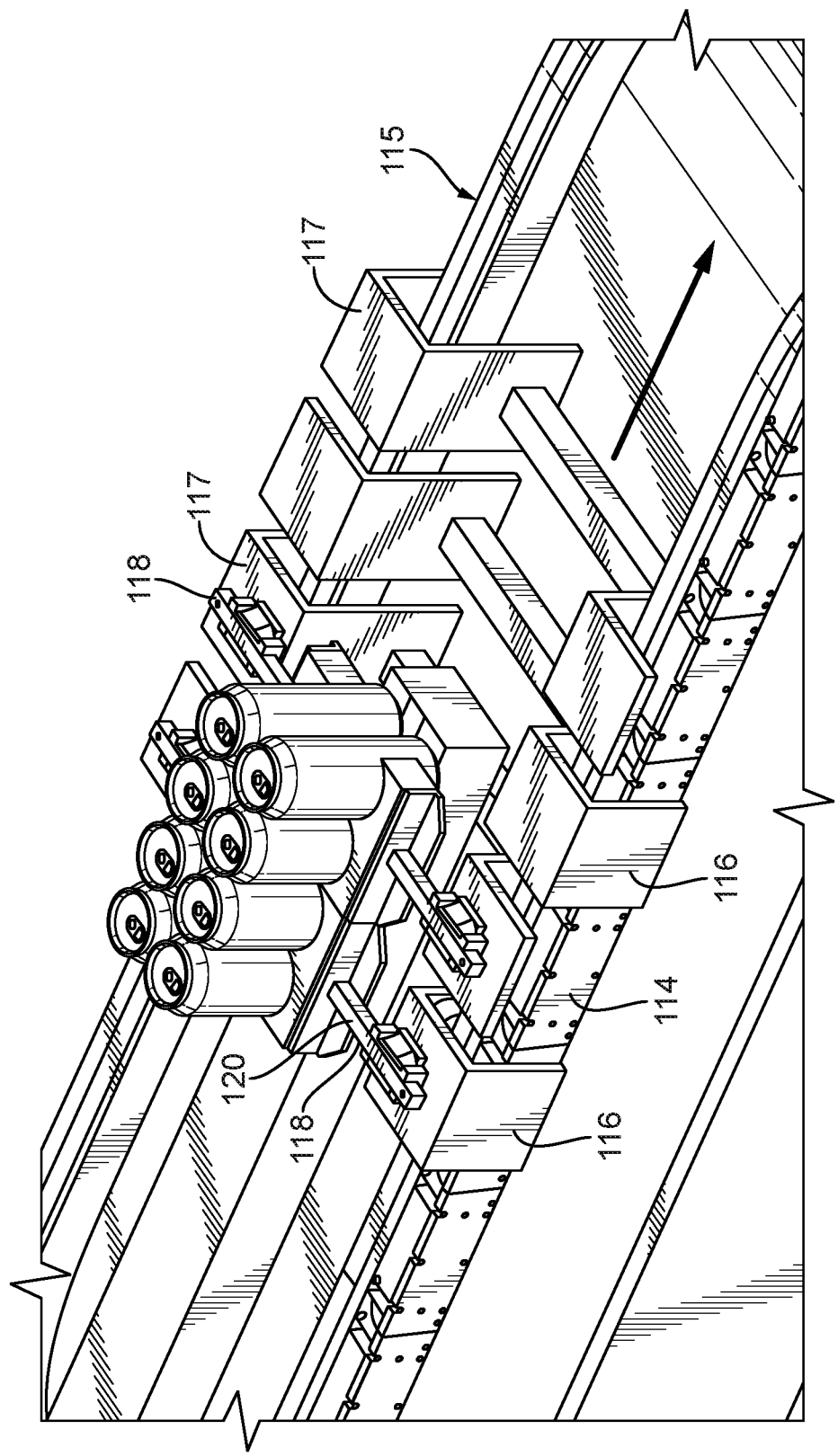

FIG. 1*a* shows, a second series of magnetic sources 115 is disposed circumferentially along a second continuous track 107 that is parallel to the first continuous track. The second track 107 and second series of magnetic sources 115 can be located within a second panel 103 located opposite the first panel 102. A second series of lugs 117 are movably dispersed around the second continuous track 107 configured to react to the second series of magnetic sources 115. The lugs of the first series of lugs 116 and the lugs of the second series 117 of lugs are alternatingly arranged along the first track 106 and alternatingly arranged along the second track 107. Although both of the series of lugs 116, 117 slide by both tracks, the lugs are controlled correspondingly by each of the magnetic sources 114, 115. A single magnetic source is not capable of controlling lugs at the desired spacing between each lug and the desired speeds. In order for the system to be able of handling the required product throughput, each of the lugs have to spaced by no more than 100 cm apart. Given the constraint of the system from a magnet perspective, each of the lugs of the first series of lugs 116 are not able to meet the 100 cm spacing requirement. The use of the second series of lugs 117, intermittently spaced with the first series of lugs 116 allows the system the meet the desired 100 cm spacing between each consecutive lug.

Referring further to FIGS. 1 and 1*a*, each product engagement member 118 includes at least one arm 120 actuatable in two Cartesian directions. The arm 120 slides back and forth along the base of each product engagement member 118. The arm 120 can also side along the direction of travel of the lugs 116, 117. The arm 120 slides in order to precisely contact the necessary products or bottles.

Figure 2A:
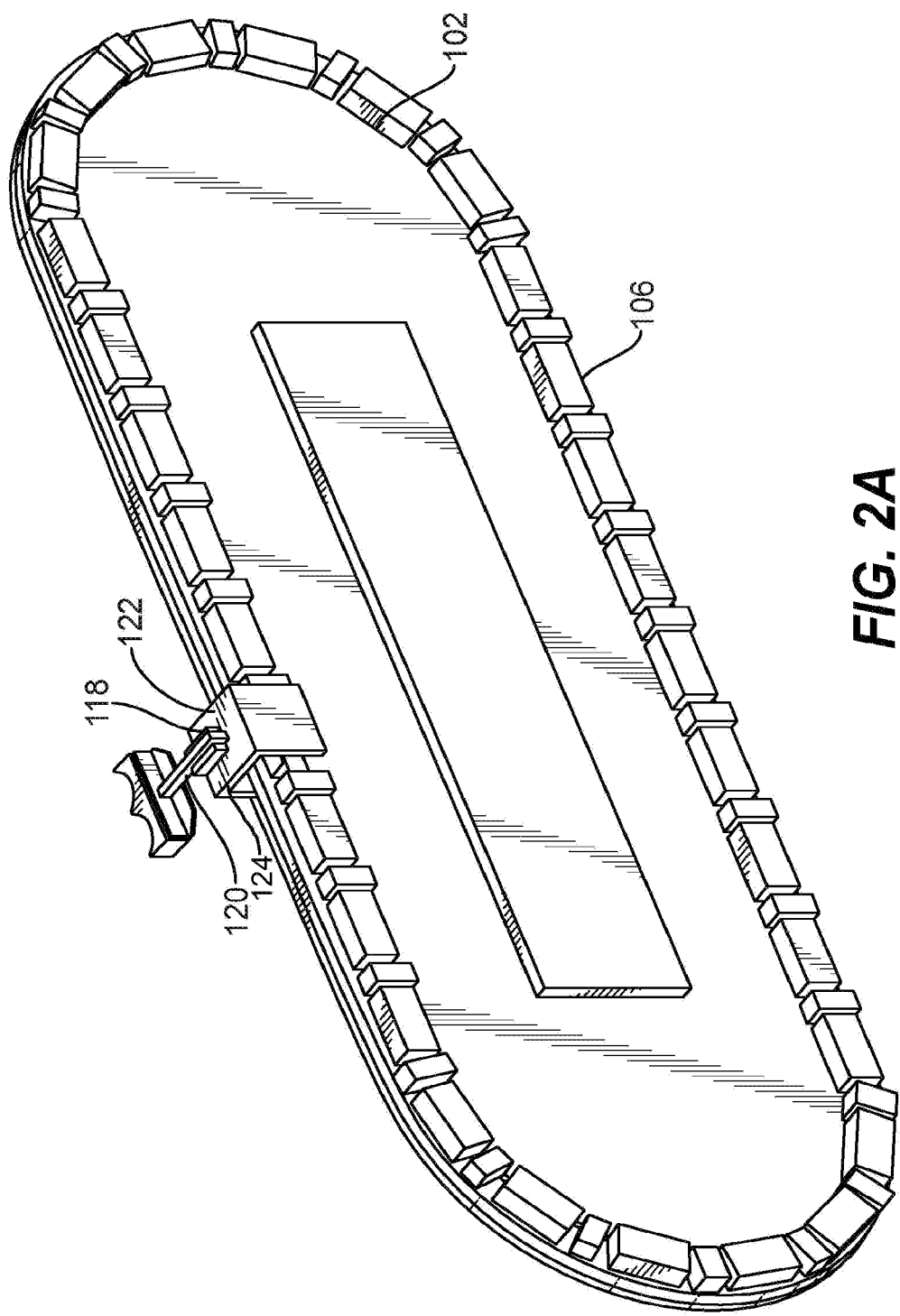
FIG. 2a is a perspective view of a portion of FIG. 1, showing a first embodiment of a product engagement member.

As shown in FIGS. 1*a* and 2*a*, a first embodiment with each lug 116, 117 including a first product engagement member base 122 controlled by its respective magnetic sources 114, 115, and a second product engagement member base 124 (shown in FIG. 1*a*) spaced apart from and dependent on the first product engagement member base, wherein each base includes a product engagement member 118. In this embodiment, the arm 120 includes a pair of semicircular ends configured and adapted to engage a can or bottle product.

Figure 2B:
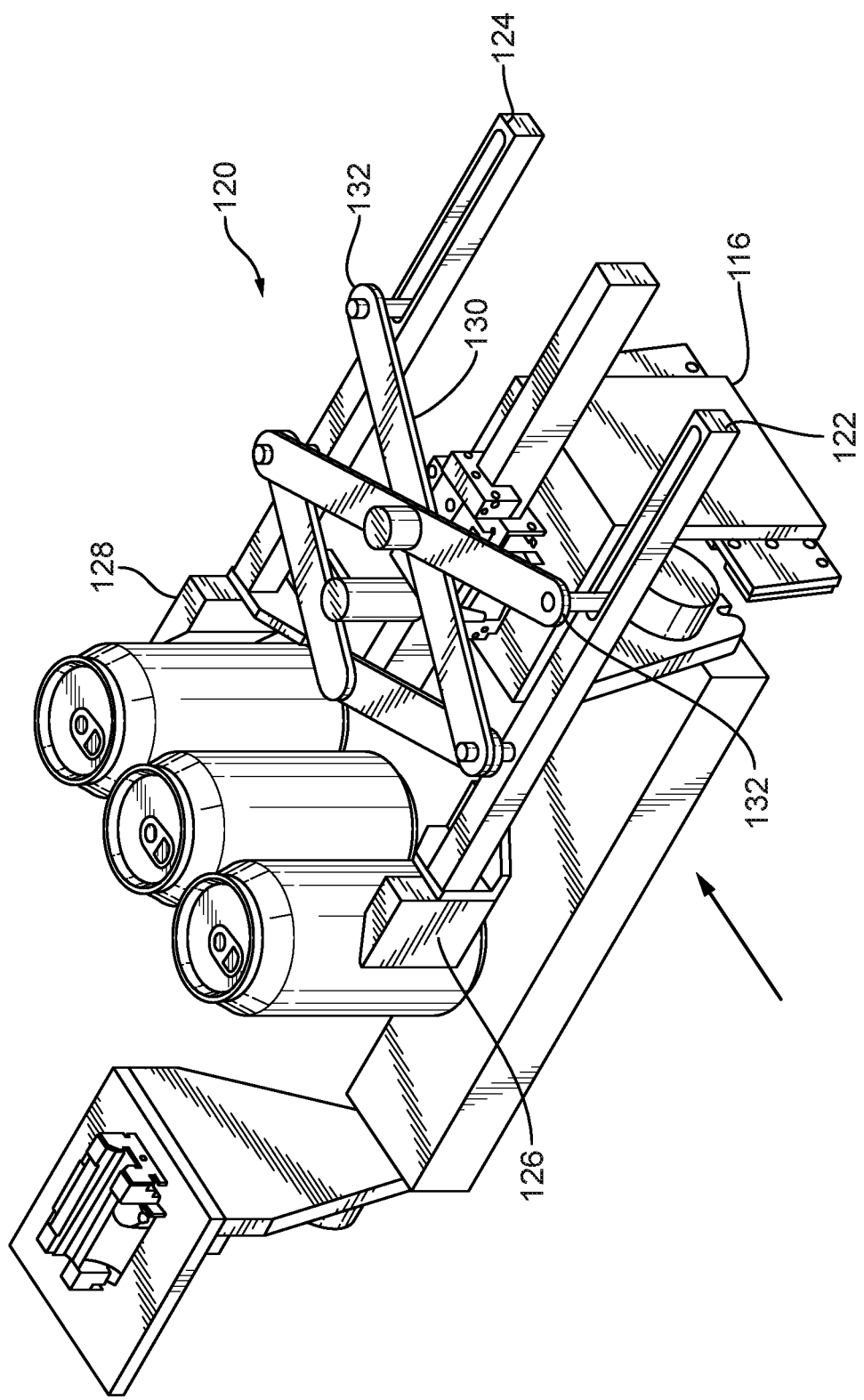
FIG. 2b is a perspective view of a portion FIG. 1, showing a second embodiment of a product engagement member.

FIG. 2*b* shows an alternate embodiment of the arm 120. In this embodiment each lug 116 includes a first paddle 126 and second paddle 128 connected to an arm 120, each paddle configured and adapted to engage a trailing or leading side of the product. The first paddle 126 and the second paddle 128 are attached to the lug by a pantograph link 130, which allows the paddles 126, 128 to move apart from each other, and allows them 126, 128 to move towards the product in order to grab on to the product. The ends 132 of the pantograph links are also translatable in a single direction along the base.

FIG. 2*c* shows a third embodiment of the arm 120, wherein each lug includes a primary base 136 and secondary base 138, wherein the secondary base 138 is dependent on the primary base 136, and wherein each base includes a paddle 140. The primary base 136 is controlled by the magnetic source, while the secondary base 138 is spaced apart from the primary base 136 according to the position on the track.

Figure 3:
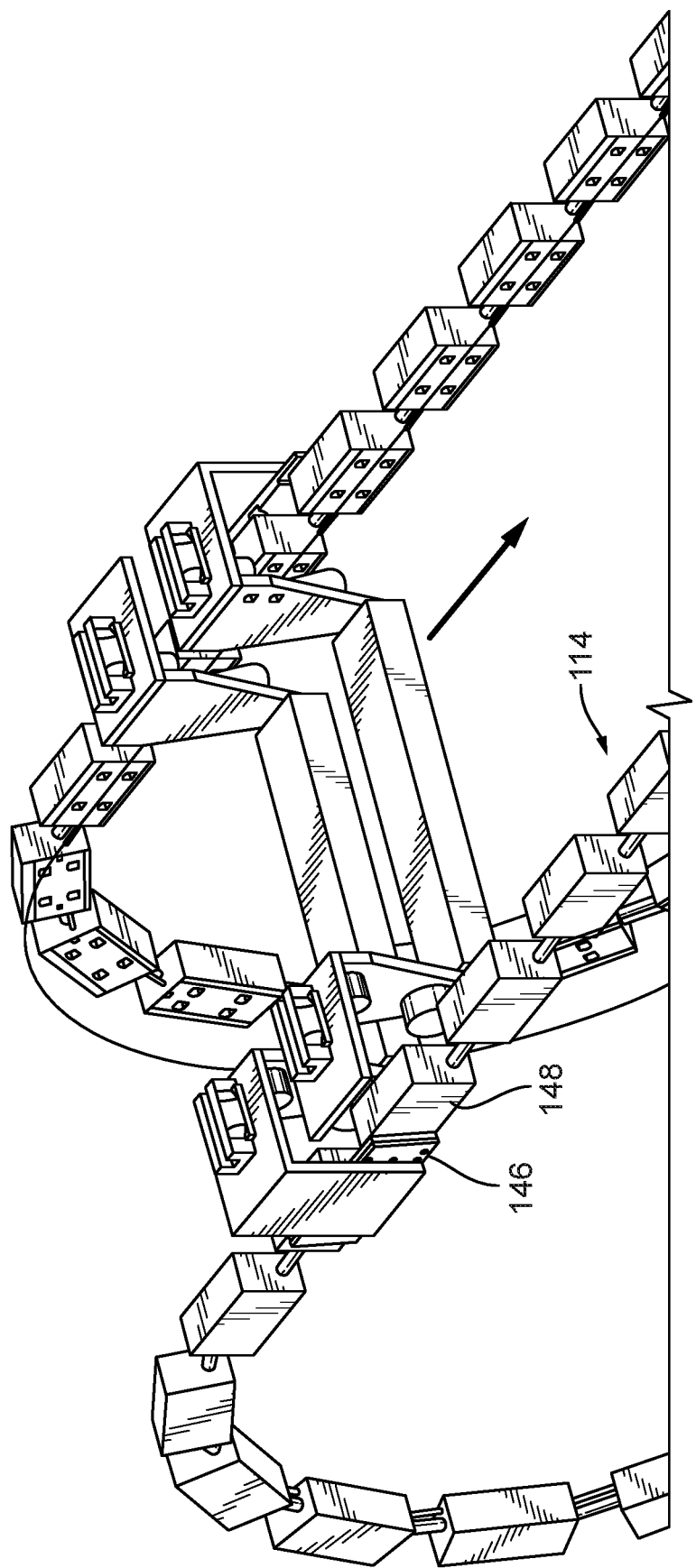
FIG. 3 is a perspective view of a portion of FIG. 1, showing the layout of magnetic sources.
Figure 4A:
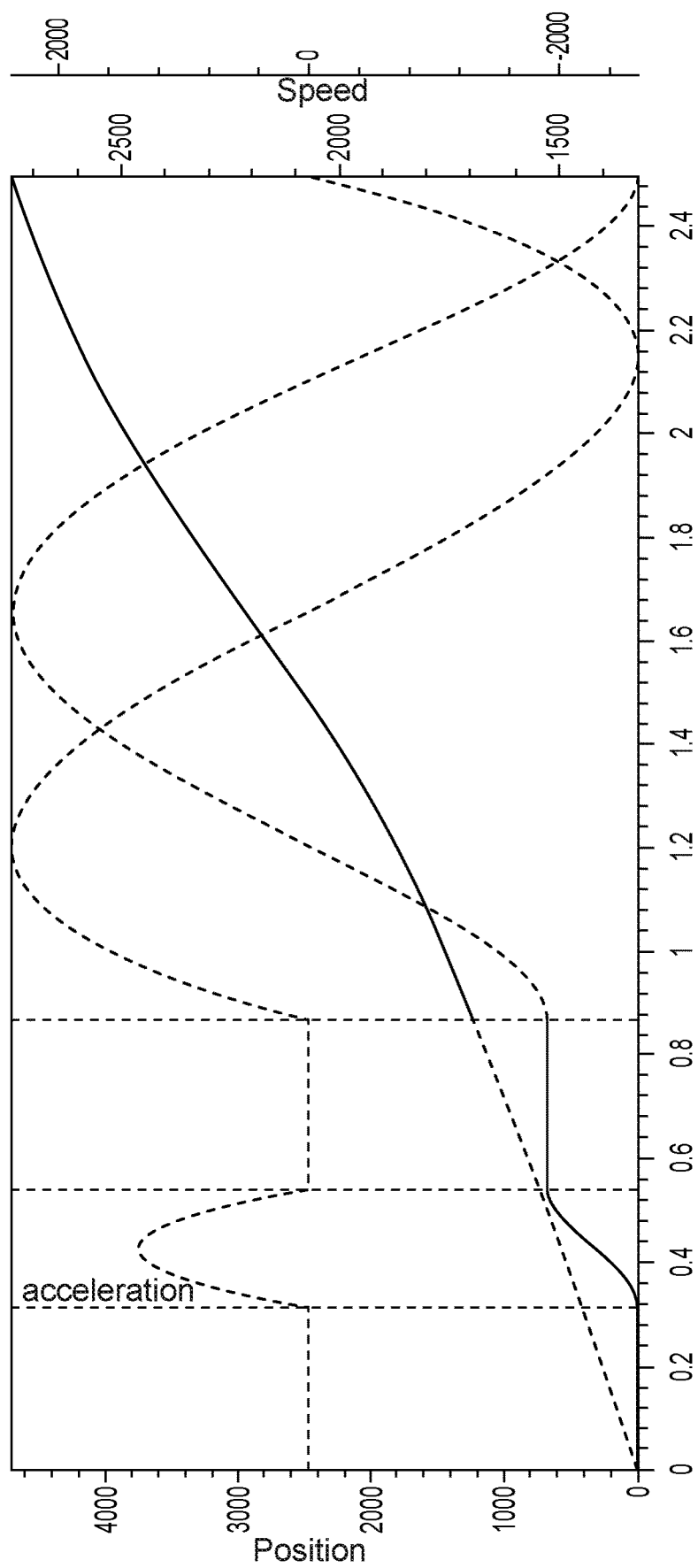
FIGS. 4a-4b show graphical representations of potential position, velocity, and acceleration profiles of each lug at a given point in the cycle.
Figure 4B:
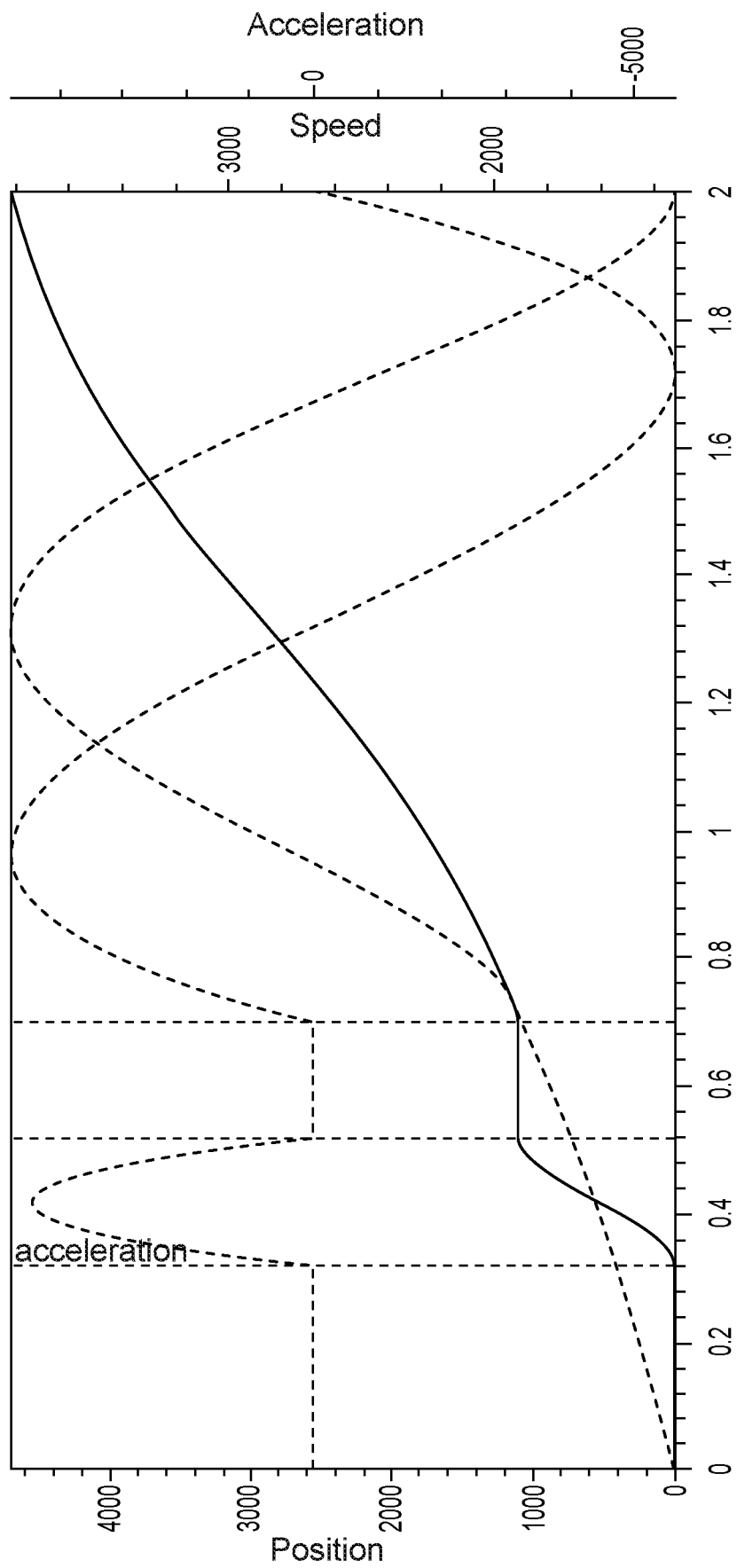

Referring to FIG. 3, the first series of magnetic sources 114 includes a series of magnetic plates 146 tangentially disposed along the first track 106, and a series of coils 148 configured and adapted to activating each of the magnetic plates 146. Each of the plates 146 are individually controlled and activated by a controller (not shown). The controller is configured and adapted to provide a configurable speed profile for lugs traveling along the first track. As shown in FIG. 4*a*-4*b*, possible speed profiles include acceleration sections, deceleration sections, and constant speed sections for the lugs.

The methods and systems of the present disclosure, as described above and shown in the drawings, provide for a flexible pitch product metering system with superior properties including increased reliability and stability, and reduced size, and more adaptable to various product requirements. While the apparatus and methods of the subject disclosure have been showing and described with reference to embodiments, those skilled in the art will readily appreciate that changes and/or modifications may be made thereto without departing from the spirit and score of the subject disclosure.

What is claimed is:

1. A product management system comprising:
   a first continuous track including a product engagement section and a return section; and
   a first series of magnetic sources disposed along the first continuous track;
   a first series of lugs movably dispersed around the first continuous track configured to react to the first series of magnetic sources in order to increase or decrease a velocity of each lug of the first series of lugs along the first continuous track; and
   a product engagement member attached to each lug configured and adapted to actuate to engage a product,
   wherein each lug comprises at least one of: (i) a primary base and a secondary base, and (ii) a first product engagement member base and a second product engagement member base,
   wherein at least one of the primary base and the first product engagement member base is controlled by the magnetic source, and at least one of the secondary base and the second product engagement member base is independent of the magnetic source.

2. The product management system of claim 1, further comprising:
   a second series of magnetic sources disposed along a second continuous track disposed parallel to the first continuous track; and
   a second series of lugs movably dispersed around the second continuous track configured to react to the second series of magnetic sources in order to increase or decrease a velocity of each lug of the second series of lugs along the second continuous track.

3. The product management system of claim 2, wherein the lugs of the first series of lugs and the lugs of the second series of lugs are alternatingly arranged along the first track and along the second track so as to alternate in the direction of movement of the lugs.

4. The product management system of claim 1, wherein each lug includes the first product engagement member base and the second product engagement member base,
wherein the first product engagement member base includes a first product engagement member and the second product engagement member base includes a second product engagement member.

5. The product management system of claim 1, wherein the product engagement member includes at least one arm actuatable in two Cartesian directions.

6. The product management system of claim 5, wherein the arm includes at least one semi-circular end configured and adapted to engage a can or bottle product.

7. The product management system of claim 5, wherein the arm includes a paddle configured and adapted to engage a trailing or leading side of the product.

8. The product management system of claim 7, wherein each lug includes a first paddle and second paddle.

9. The product management system of claim 1, further comprising a first cam and a second cam configured for supporting the series of lugs.

10. The product of management system of claim 9, wherein each of the cams partially follow the first track and includes at least a pair of undulations.

11. The product management system of claim 1, wherein the first series of magnetic sources includes a series of magnetic plates that are disposed along the first track, and a series of coils configured and adapted to activate each of the magnetic plates.

12. The product management system of claim 11, wherein a controller controls each of the magnetic plates.

13. The product management system of claim 12, where the controller is configured and adapted to provide a configurable speed profile for lugs traveling along the first track.

14. The product management system of claim 13, wherein the speed profile includes acceleration sections, deceleration sections, and constant speed sections.

15. The product management system of claim 1, including at least one star wheel disposed proximate to the lug engagement section of the first continuous track configured and adapted to meter products to the lug engagement section.

16. The product management system of claim 15, further comprising a second star wheel.

17. A product management system, comprising:
a first continuous track including a product engagement section and a return section;
a first series of magnetic sources disposed along the first continuous track;
a first series of lugs movably dispersed around the first continuous track configured to react to the first series of magnetic sources in order to increase or decrease a velocity of each lug of the first series of lugs along the first continuous track;
a product engagement member attached to each lug configured and adapted to actuate to engage a product;
a second series of magnetic sources disposed along a second continuous track disposed parallel to the first continuous track; and
a second series of lugs movably dispersed around the second continuous track configured to react to the second series of magnetic sources in order to increase or decrease a velocity of each lug of the second series of lugs along the second continuous track,
wherein the lugs of the first series of lugs and the lugs of the second series of lugs are alternatingly arranged along the first track and along the second track so as to alternate in the direction of movement of the lugs.

18. The product management system of claim 17, wherein each lug includes a first product engagement member base and a second product engagement member base,
wherein the first product engagement member base includes a first product engagement member and the second product engagement member base includes a second product engagement member.

19. A product management system, comprising:
a first continuous track including a product engagement section and a return section;
a first series of magnetic sources disposed along the first continuous track;
a first series of lugs movably dispersed around the first continuous track configured to react to the first series of magnetic sources in order to increase or decrease a velocity of each lug of the first series of lugs along the first continuous track; and
a product engagement member attached to each lug configured and adapted to actuate to engage a product,
wherein each lug includes a first paddle and second paddle, and
wherein the first paddle and the second paddle are attached to the lug by a pantograph linkage.

20. The product management system of claim 19, wherein each lug consists of a primary base and a secondary base, wherein the primary base is controlled by the magnetic source and the secondary base is independent of the magnetic source, and wherein each base includes one of the first paddle and the second paddle.

* * * * *